United States Patent
Aoyama

[11] Patent Number: 5,993,319
[45] Date of Patent: Nov. 30, 1999

[54] HOME TELEVISION-GAME APPARATUS WITH TIME MANAGEMENT UNIT

[75] Inventor: Koji Aoyama, Hokkaido, Japan

[73] Assignee: Hudson Soft Co., Ltd., Hokkaido, Japan

[21] Appl. No.: 08/755,067

[22] Filed: Nov. 22, 1996

[30] Foreign Application Priority Data

Dec. 21, 1995 [JP] Japan .................................. 7-349636

[51] Int. Cl.⁶ ....................................................... A63F 9/22
[52] U.S. Cl. .............................. 463/43; 463/29; 463/44; 364/410.1
[58] Field of Search .................................. 463/1, 30, 43, 463/44, 24, 29; 364/410.1

[56] References Cited

U.S. PATENT DOCUMENTS 5,203,848  4/1993  Wang ...................................... 273/435
5,267,734  12/1993  Stamper et al. ......................... 273/434

FOREIGN PATENT DOCUMENTS 2211975  7/1989  United Kingdom.

Primary Examiner—Valencia Martin-Wallace
Assistant Examiner—James C. Schaaf
Attorney, Agent, or Firm—McDermott, Will & Emery

[57] ABSTRACT

A home TV-game apparatus of this invention has a memory storing a game program, a CPU for processing the game program, and time management elements managing a time of the game in correspondence with real time. In the home TV-game apparatus, therefore, a virtual reality type game using real time, e.g., a roll playing game, is easy to play and easy to make since the clock control of the game program does not have to be considered, and the development cost of the virtual reality type game is not expensive.

1 Claim, 3 Drawing Sheets

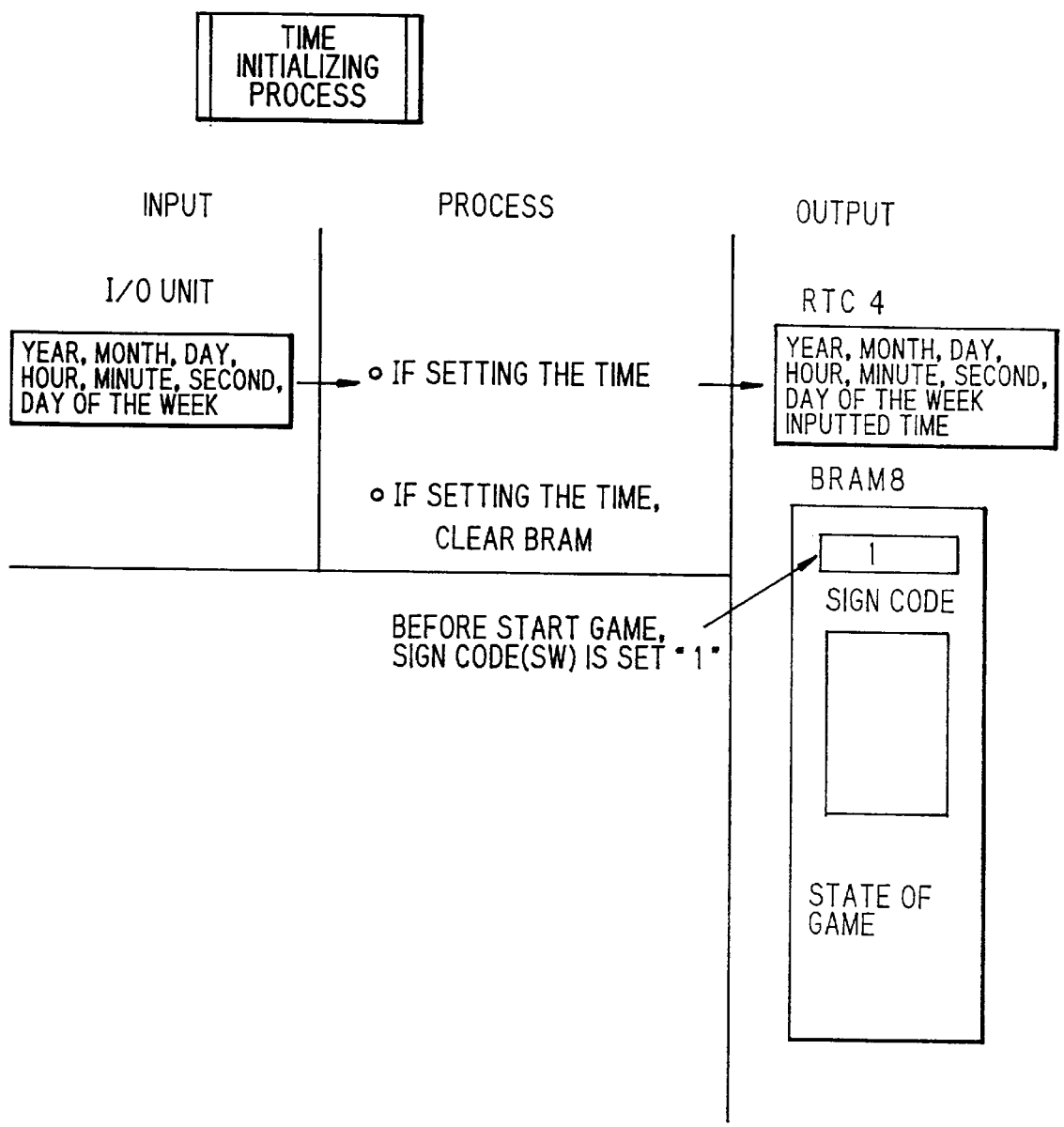

HOME TELEVISION-GAME APPARATUS WITH TIME MANAGEMENT UNIT

FIELD OF THE INVENTION

The invention relates to a home television (TV) game apparatus, and more particularly to, a home TV-game apparatus which has a time management unit therein or in an external storage unit (memory) for performing a game based on a real time.

BACKGROUND OF THE INVENTION

A conventional home TV-game apparatus comprises a CPU, one or more memories, a plurality of I/O (Input/Output) interfaces and a timer.

In the conventional home TV-game apparatus, the timer checks a difference between a starting time of a game and a current time, or between any time while playing a game and current time.

In the conventional home TV-game apparatus, however, there are disadvantages in that a virtual reality type game using real time, for example, a roll-playing game, is difficult to play, because the timer does not correspond with the real time. In addition, the virtual reality type game is difficult to make and development of the virtual reality type game is very expense because the real time must be controlled by a program of the virtual reality type game.

SUMMARY OF THE INVENTION

Accordingly, it is an object of the invention to provide a home TV-game apparatrus in which a virtual reality type game, such as a roll playing game using real time, is easy to play.

It is another object of the invention to provide a home TV-game apparatus in which a virtual reality type game is easy to make.

It is a further object of the invention to provide a home TV-game apparatus in which a virtual reality type game is developed without increasing programming cost.

According to a first feature of the invention, a home TV-game apparatus, comprises means for storing a game program, a CPU for processing the game program, and time management means for managing time of the game in correspondence with the real time.

According to a second feature of the invention, a ROM cartridge for a home television (TV)-game apparatus, comprises means for storing a game program, and time management means for managing time of the game in correspondence with the real time.

BRIEF DESCRIPTION OF THE DRAWINGS

The invention will be described in more detail in conjunction with the accompanying drawings, wherein:

FIG. 3 is a block diagram of a time initializing process of FIG. 2.

DETAILED DESCRIPTION OF THE PREFERRED EMBODIMENTS

Before explaining a home TV-game apparatus in the preferred embodiment according to the invention, the above mentioned conventional home TV-game apparatus will be explained.

The conventional home TV-game apparatus comprises a CPU, one or more memories, I/O (Input/Output) interfaces and a timer.

In the above conventional home TV-game apparatus, the timer checks a difference between current time and a starting time of a game or any time while playing a game. Namely, time between a previous action and a next action in a game is set to be limited by a program of the game. While playing a game, elapsed time from the previous action to the next action is counted by the timer. Then, a player must take the next action before the elapsed time counted by the timer exceeds a time limit. For example, in a chess game, a player must take a next action before elapsed time of one action exceeds a predetermined time. Each time the action is finished, the elapsed time of the action in the timer is cleared.

On the other hand, when a virtual reality type game is played, real time is a very important element, consequently the virtual reality type game is played according to real time. Further, while the virtual reality type game is played, or when the virtual reality type game is restarted from the middle, or from a suspended scene, it is necessary to match the real time with the time in the virtual reality type game.

In the conventional home TV-game apparatus, however, the timer does not have a unit for applying real time to a game. In the conventional home TV-game apparatus, therefore, real time may be applied to a virtual reality type game by a program of the virtual reality type game. In this case, it is necessary to supply a variety of program logics for all situations in the virtual reality type game. Consequently, the virtual reality type game is difficult to make and development cost of the virtual reality type game is very expensive. Further, if a memory size of a home TV-game apparatus is smaller than a game program size, the game may not be made or played.

Therefore, a unit for applying real time to a game is necessary.

Next, a home TV-game apparatus with a time management unit in a first preferred embodiment according to the invention will be explained in FIGS. 1 to 3.

Figure 1:
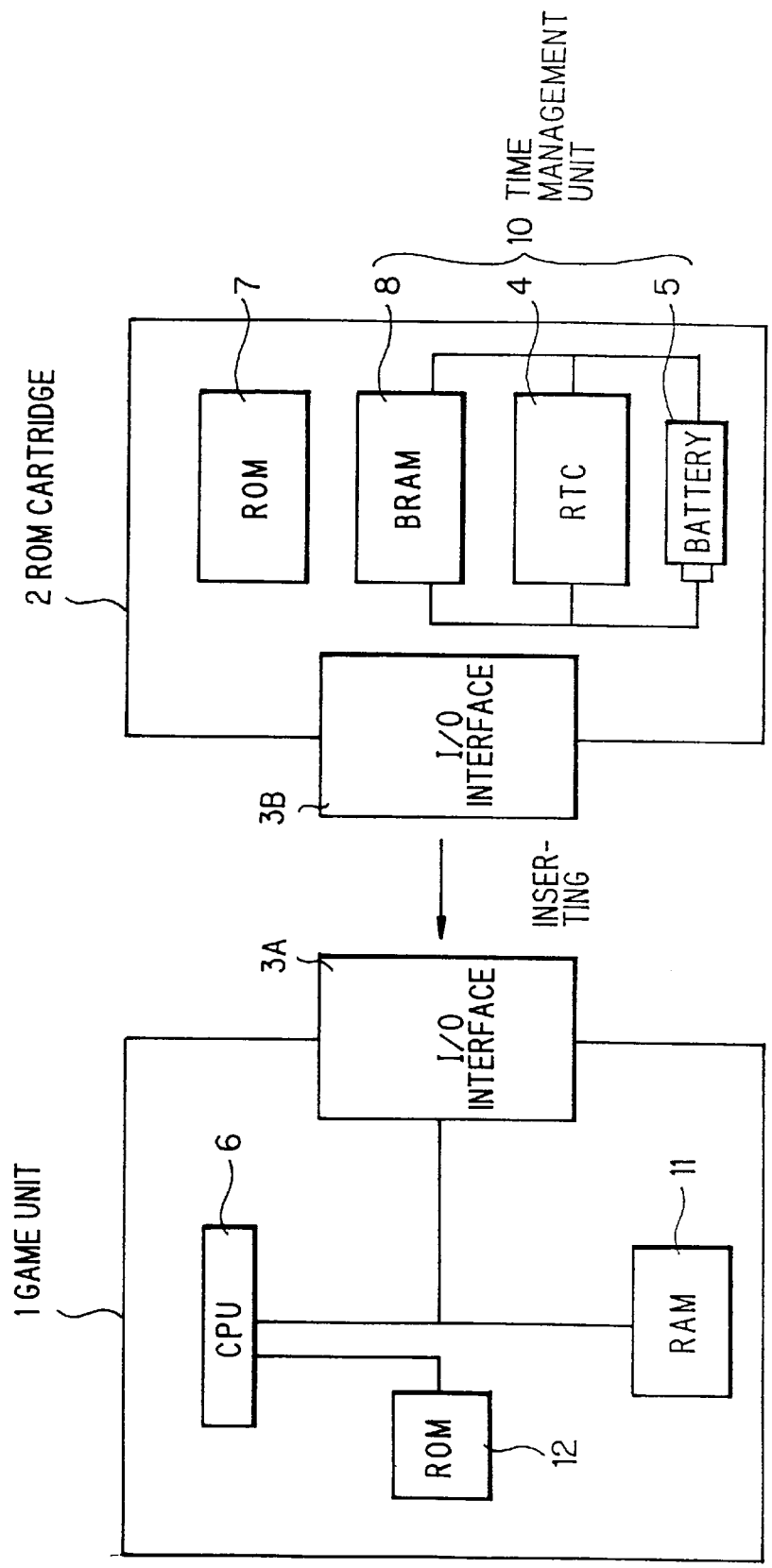
FIG. 1 is a block diagram of a game unit and a ROM cartridge of the present invention.

FIG. 1 is a block diagram of a game unit and a ROM cartridge of the present invention. The home TV-game apparatus comprises a game unit 1 and a ROM (Read Only Memory) cartridge 2. The game unit 1 has a CPU 6, an I/O interface 3A a RAM 11 for storing data read from a ROM 7 in the ROM cartridge 2, and a ROM 12 for storing an operation program. The ROM cartridge 2 has the ROM 7, an I/O interface 3B, and a time management unit 10.

The time management unit 10 has a BRAM (Backup Random Access Memory) 8, a battery 5, and a RTC (Real Time Clock) 4. The RTC 4, the BRAM 8, and the battery 5 are connected to each other.

In the time management unit 10, the RTC 4 is an IX (Integrated Circuit) having a clock function and a calendar function. A time of a game is made to correspond with real time by the clock function and the calendar function in the RTC 4. Namely, the RTC 4 saves therein, the year, month, day, day of the week, hour, minute, and second of the real time while the game operates by using the clock function and the calendar function. The battery 5 in the time management unit 10, which is connected with the RTC 4, supplies the RTC 4 with a power source. Therefore, if the ROM cartridge 2 is detached from the game unit 1, the RTC 4 correctly saves therein, the time of the game independently of the game unit 1.

Further, in the time management unit 10, the BRAM 8 stores therein a sign code and the middle or suspended state of the game. The sign code is used to determine whether or not the time of the game is set into the RTC 4. Namely, if the sign code is "0", the time of the game may be set into the RTC 4. If the sign code is "1", the time of the game may not be set into the RTC 4, because the time of the game already has been set into the RTC 4. The battery 5 in the time management unit 10, which is connected with the BRAM 8, supplies the BRAM 8 with a power source. Therefore, even if the ROM cartridge 2 is detached from the game unit 1, the BRAM 8 correctly stores therein, the sign code and the middle or suspended state of the game independently of the game unit 1.

In FIG. 1, the I/O interface 3B is connected with the I/O interface 3A by inserting the ROM cartridge 2 into the game unit 1. A game program, for example, a virtual reality type game program, is stored in the ROM 7 of the ROM cartridge 2. The CPU 6 accesses the ROM 7 and the time management unit 10, including the RTC 4 and the BRAM 8. Then, the CPU 6 loads the game program from the ROM 7 with the contents in the RTC 4 and the BRAM 8. More precisely, the game program from the ROM cartridge 2 is transferred to be stored in the RAM 11. The game program, and the contents in the RTC 4 and the BRAM 8 are supplied to the game unit 1 through the connected I/O interfaces 3A and 3B. Then, the CPU 6 processes the game program according to the contents from the RTC 4 and the BRAM 8.

Next, operation of the invention will be explained with reference to FIG. 2 which is a processing flow chart of the time management unit 10 of the present invention. After the ROM cartridge 2 is inserted into the game unit 1, the game unit 1 is powered on at the step 20. At the step 21, when a time management process is started, the sign code (SW) is inputted from the BRAM 8 into the CPU 6. The sign code (SW) identifies whether or not the time of the game already has been set. Then, at the step 22, a content of the sign code (SW) is confirmed. If the sign code (SW) is "1", the time of the game has been already set into the RTC 4, and the step 28 follows. If the sign code (SW) is not "1", and is "0" or blank, the step 23 follows, because the time of the game has not been set into the RTC 4 yet.

At the step 23, a time initializing process is performed to set the time of the game into the RTC 4. In the time initializing process, the request message for entering the time of the game in the RTC 4 is displayed for a game player. When the game player has completed setting the time of the game, the step 24 follows. At the step 24, the sign code (SW) is first set on "0". Then, at the step 25, when it is recognized that the sign code (SW) is "0", the step 26 follows.

At the step 26, the sign code (SW) is set to "1". A prologue of the game starts. Next, at the step 27, the game starts. If the game player wants to stop the game in the middle, or during the course of the game, a state of the middle of the game, or the suspended state of the game and the sign code (SW), which is "1", are saved in the BRAM 8.

When the game player starts the game again, the game unit 1 is powered on at the step 20. At the step 21, when a time management process is started, the sign code (SW) is inputted from the BRAM 8 into the CPU 1. At the step 22, when it is recognized that the sign code (SW) is "1", the step 28 follows.

At the step 28, the message as to whether or not the game player loads the saved game (the middle of the game) is displayed. When the game player selects "YES", namely when the player wants to start from the middle of the game, the step 29 follows.

At the step 29, the sign code (SW) is set to be "1" again. Then, at the step 25, when it is recognized that the sign code (SW) is not "0" (the sign code (SW) is "1"), the step 30 follows.

At the step 30, the saved game is loaded from the BRAM 8 into the CPU 6. Next, at the step 27, the play is started from the middle of the game which has been saved.

On the other hand, at the step 28, when the game player selects "NO", the step 31 follows. At the step 31, the message as to whether or not the game player wants to clear the saved game (the middle of the game) in the BRAM 8 is displayed. When the player selects "NO", namely, when the game player does not want to clear the saved game, the step 29 follows. When the game player selects "YES", the step 32 follows. Namely, whether to proceed to the step 32 is checked at both the steps 28 and 31. At the step 32, the data in the BRAM 8 is cleared. Then, the time initializing process is performed to set the time of the game into the RTC 4. In the time initializing process, the request message for entering the time of the game in the RTC 4 is displayed for the game player. When the game player has completed setting the time of the game, the step 33 follows. At the step 33, the sign code (SW) is reset to "0". At the step 25, when it is recognized that the sign code (SW) is "0", the step 26 follows.

At the step 26, the sign code (SW) is reset to "1". A prologue of the game is started. Next, at the step 27, the game is started.

Figure 2:
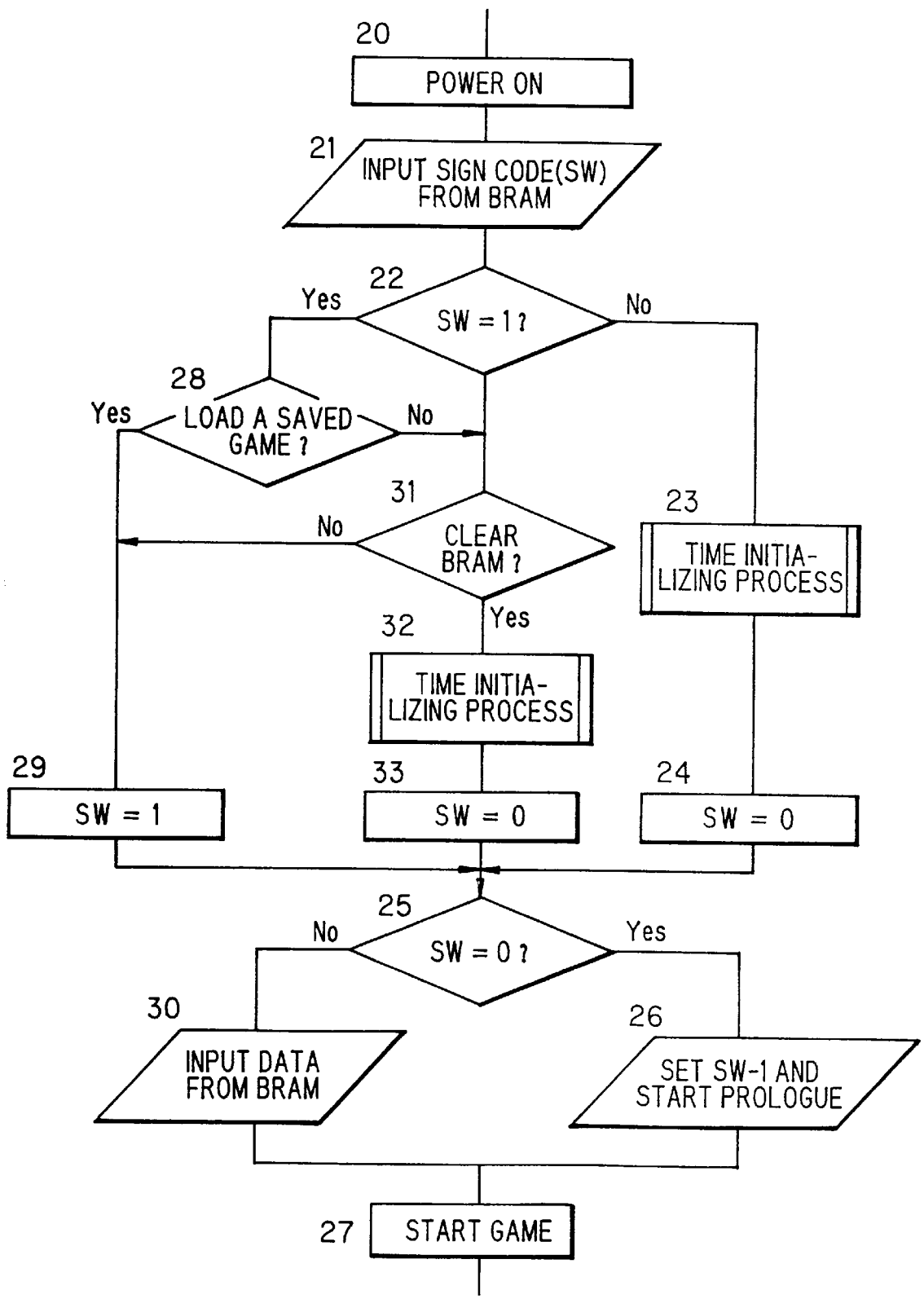
FIG. 2 is a processing flow chart of a time management unit of the present invention.

FIG. 3 is a block diagram of the time initializing process of FIG. 2. In FIG. 3, the time initializing process may be divided into the three processes which are the "INPUT", the "PROCESS" and the "OUTPUT" respectively. In the "INPUT", data of year, month, day, hour, minute, second, and day of the week are inputted from an I/O unit. In the "PROCESS", if the performed process is for setting the time of the game, the inputted data is outputted into the RTC 4 in the "OUTPUT". On the other hand, in the "PROCESS", if the performed process is to reset the time of the game, the BRAM 8 is cleared. Then, in the "OUTPUT", the inputted data is outputted to the RTC 4. Before the game is started, the sign code (SW) is set to "1".

There, in the home TV-game apparatus, it is easy to play a virtual reality type game using real time, e.g., a roll playing game. For example, in the virtual reality type game, at first, the game is started and stopped in the middle of the game on December 1. Next, when the game is restarted on December 5, the time of the game is same as the real time (December 5). The virtual reality type game is also easier to make without having to consider the clock control of the game program. Further, the development cost of the virtual reality type game is not expensive.

In another preferred embodiment according to the invention, in FIG. 1, the time management unit 10 may be provide in the game unit 1. Further, the BRAM 8 may be replaced with a non-volatile memory such as an EEPROM (Electrically Erasable Programmable Read Only Memory) or a flash memory.

As this invention may be embodied in several forms without departing from the spirit of essential characteristics thereof, the present embodiment is therefore illustrative and not restrictive, since the scope of the invention is defined by the appended claims rather than by the description proceeding them, and all changes that fall within meets and bounds of the claims, or equivalence of such meets and bounds are therefore intended to be embraced by the claims.

What is claimed is:

1. A method of playing a home television-game on basis of real time, comprising the steps of:

inserting a ROM cartridge into a home television game unit, said ROM cartridge comprising a memory and a real time clock, respectively supplied with power from a battery, and a ROM storing a game program;

displaying a request message for a game player to enter a first time of said home television-game into said real time clock, thereby carrying out a time initializing process;

setting a sign code into said memory to store a state where said time initializing process is carried out, while starting said home television-game by loading said game program into said home television-game unit;

storing an interruption state of said home television-game into said memory, when said home television-game is interrupted;

outputting said sign code of said state from said memory to said home television-game unit, when said home television-game is started after interruption thereof;

displaying a request message for said game player to select or not select a restarting process where said interruption state of said home television-game is loaded from said memory to said home television-game unit;

restarting said home television-game on basis of a second time of said home television-game which is calculated on said first time thereof by said real time clock, when said restarting process is selected;

clearing said interruption state from said memory, when said restarting process is not selected, thereby carrying out said time initializing process; and setting the sign code into said memory to store the state where said time initializing process is carried out, while starting said home television game by loading said game program into said home television game unit.

* * * * *